United States Patent [19]

Jacobson

[11] Patent Number: 5,243,332
[45] Date of Patent: Sep. 7, 1993

[54] INFORMATION ENTRY AND DISPLAY
[75] Inventor: Joseph M. Jacobson, Cambridge, Mass.
[73] Assignee: Massachusetts Institute of Technology, Cambridge, Mass.
[21] Appl. No.: 786,073
[22] Filed: Oct. 31, 1991
[51] Int. Cl.$^5$ .................................................. G09G 3/20
[52] U.S. Cl. ........................................ 345/44; 382/68; 250/208.1; 345/179; 345/76
[58] Field of Search ............... 340/781, 766, 760, 758, 340/707, 706, 708, 712; 313/507, 506; 315/169.3; 382/68, 65; 358/479, 494, 497; 178/18, 19; 359/202; 250/208.1

[56] References Cited

U.S. PATENT DOCUMENTS

| | | | |
|---|---|---|---|
| 3,505,561 | 4/1970 | Ward et al. | 315/18 |
| 3,816,824 | 6/1974 | Thust et al. | 340/324 |
| 4,017,848 | 4/1977 | Tannas, Jr. | 340/365 R |
| 4,035,774 | 7/1977 | Chang | 340/166 EL |
| 4,078,257 | 3/1978 | Bagley | 364/900 |
| 4,177,354 | 12/1979 | Mathews | 178/18 |
| 4,224,615 | 9/1980 | Penz | 340/712 |
| 4,262,281 | 4/1981 | Buckle et al. | 340/146.3 SY |
| 4,290,061 | 9/1981 | Serrano | 340/712 |
| 4,303,916 | 12/1981 | Hakaridani et al. | 340/712 |
| 4,305,071 | 12/1981 | Bell et al. | 340/712 |
| 4,334,219 | 6/1982 | Paülus et al. | 340/712 |
| 4,345,248 | 8/1982 | Togashi et al. | 340/784 |
| 4,346,376 | 8/1982 | Mallos | 340/712 |
| 4,367,465 | 1/1983 | Mati et al. | 340/707 |
| 4,371,893 | 2/1983 | Rabeisen | 358/93 |
| 4,377,810 | 3/1983 | Wolff | 340/707 |
| 4,405,921 | 9/1983 | Mukaiyama | 340/708 |
| 4,475,161 | 10/1984 | Stock | 364/521 |
| 4,475,239 | 10/1984 | van Raamsdonk | 382/57 |
| 4,484,179 | 11/1984 | Kasday | 340/365 P |
| 4,516,112 | 5/1985 | Chen | 340/365 R |
| 4,520,357 | 5/1985 | Castleberry et al. | 340/783 |
| 4,542,375 | 9/1985 | Alles et al. | 340/712 |
| 4,567,480 | 1/1986 | Blanchard | 340/712 |
| 4,630,039 | 12/1986 | Shimada | 340/731 |
| 4,639,720 | 1/1987 | Rympalski et al. | 340/712 |
| 4,730,186 | 3/1988 | Koga et al. | 340/708 |
| 4,794,634 | 12/1988 | Torihata et al. | 340/707 |
| 4,808,880 | 2/1989 | Thioulouse | 313/507 |
| 4,875,036 | 10/1989 | Washizuka et al. | 340/784 |
| 4,877,995 | 10/1989 | Thioulouse et al. | 313/507 |
| 4,911,536 | 3/1990 | Ditzik | 350/351 |

FOREIGN PATENT DOCUMENTS

| | | |
|---|---|---|
| 0066965A1 | 5/1982 | European Pat. Off. |
| 0232905A | 2/1987 | European Pat. Off. |
| 53-72422 | 6/1978 | Japan |
| 54-119899 | 9/1979 | Japan |
| 55-83922A | 6/1980 | Japan |
| 59-35277A | 2/1984 | Japan |
| 2026745A | 6/1979 | United Kingdom |
| 2074428A | 4/1981 | United Kingdom |

OTHER PUBLICATIONS

Hamamatsu, 1990–1991 CDS Photoconductive Cells Catalog.
Stephen F. Blazo, "High Resolution Electrophoretic Display with Photoconductor Addressing," SID Digest, 1982, pp. 152–153.
Jacobson et al., "A new Television Projection Light Valve," SID Digest, 1975 pp. 87–88.
Wilson et al., *Optotectronics: An Introduction*, Prentice/-Hall, 1983, pp. v–ix.

*Primary Examiner*—Ulysses Weldon
*Assistant Examiner*—Regina Liang
*Attorney, Agent, or Firm*—Fish & Richardson

[57] ABSTRACT

Display panels are provided which enable effective document scanning, information display, and entry of information using a stylus. The panels include (in the same panel) light emitting and light detecting functions which are arranged to permit effective scanning, display, and stylus reading techniques. In one aspect there is a two-dimensional panel for scanning information at a scanning surface. The panel has a light emitting layer and a light detecting layer. The light emitting layer is configured to emit light onto the scanning surface at selected pixel locations in response to electrical signals, each electrical signal being impressed at a selected pixel location, the layer having optical apertures defining corresponding optical paths at the pixel locations for light to exit the opposite side of the layer from the scanning surface. The light detecting layer is configured to detect light exiting the layer at pixel locations. The light emitting layer is between the light detecting layer and the scanning surface.

31 Claims, 5 Drawing Sheets

THE DOCUMENT TO BE COPIED IS FACE DOWN ON THE GLASS SUBSTRATE. — 50

EVEN NUMBERED PIXELS ARE ADDRESSED WITH A VOLTAGE OVER THRESHOLD SUCH THAT THEY EMIT LIGHT. THE RESULTING PATTERN IS A CHECKERBOARD PATTERN. THE REMAINING PIXELS (ODD NUMBERED) ARE MAINTAINED AT A VOLTAGE JUST BELOW THRESHOLD. — 52

THE ILLUMINATED PIXELS (EVEN NUMBERED) ILLUMINATE THE DOCUMENT TO BE COPIED. LIGHT IS THEN REFLECTED FROM THE WHITE PARTS OF THE DOCUMENT (AND NOT REFLECTED FROM THE BLACK PARTS) TO THE PHOTOCONDUCTIVE MATERIAL. — 54

LIGHT INTERACTS WITH THE PHOTOCONDUCTIVE MATERIAL TO GENERATE CARRIER ELECTRONS LOWERING THE THRESHOLD LOCALLY AND ALLOWING THE PHOSPHER OF THE ODD NUMBERED PIXELS TO EMIT LIGHT IN REGIONS WHICH CORRESPOND TO WHITE PARTS OF THE DOCUMENT. — 56

THUS STORED IN ANALOG FASHION (AND DISPLAYED ON THE SURFACE OF THE DEVICE), BETWEEN THE ALREADY ILLUMINATED EVEN NUMBERED PIXELS, IS AN IMAGE OF THE DOCUMENT WHICH IS TO BE COPIED. — 58

THE PIXELS WHICH WERE ORIGINALLY ADDRESSED WITH A VOLTAGE ABOVE THRESHOLD (THE EVEN NUMBERED PIXELS) ARE SET TO A BELOW THRESHOLD VOLTAGE. — 60

THE ODD NUMBERED PIXELS SERVE AS ILLUMINATION FOR THE NOW BELOW THRESHOLD EVEN NUMBERED PIXELS AND THE SAME PROCESS REPEATS ITSELF THUS BUILDING UP A COMPLETE IMAGE. — 62

THE ANALOG IMAGE NOW STORED IN THE DISPLAY IS DIGITIZED AND PLACED INTO DIGITAL MEMORY BY MEANS OF AN A/D CONVERTER WHICH READS THE IMPEDENCE MEASURING EITHER CAPACITANCE OR CURRENT FOR AN A.C. OR D.C. ELECTROLUMINESCENT EFFECT BASED DEVICE RESPECTIVELY) BETWEEN ROW CONDUCTORS AND COLUMN CONDUCTORS. — 64

FIG. 3 d ≈ 100 MICRONS d ≈ 100 MICRONS d ≈ 100 MICRONS

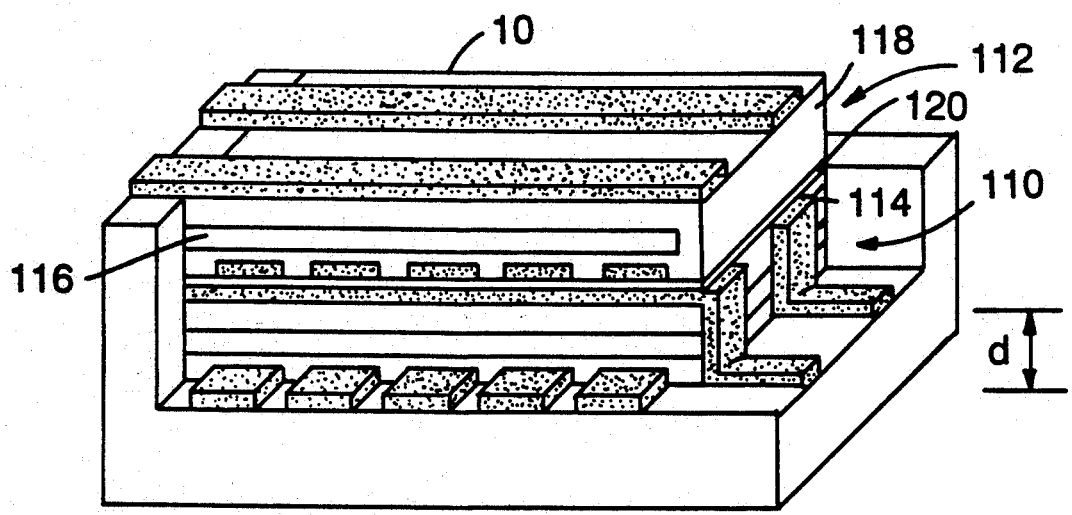
d ≈ 100 MICRONS   FIG. 7
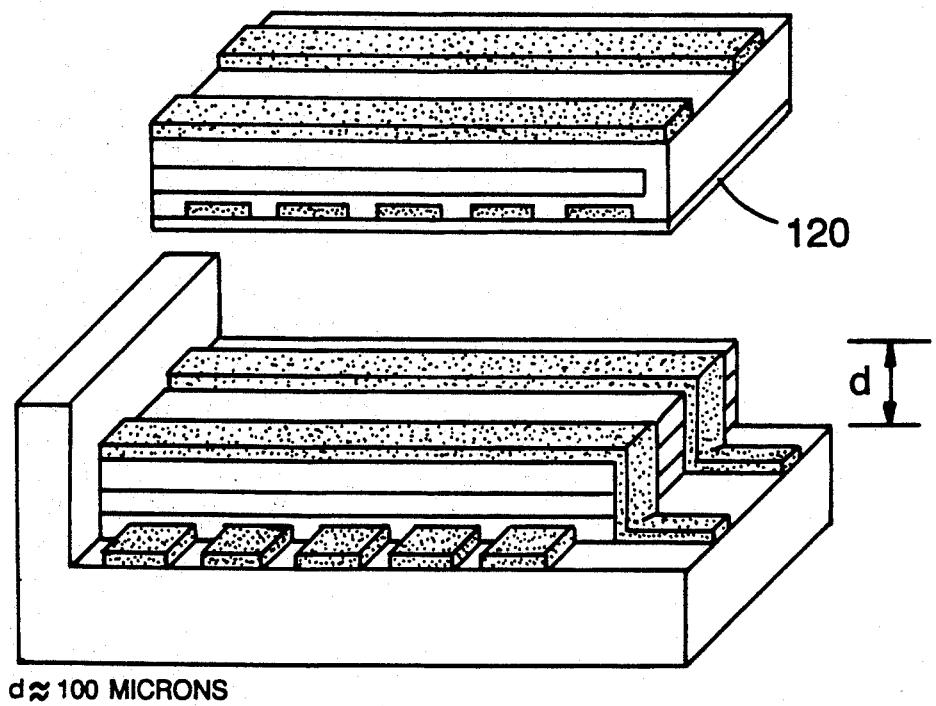
d ≈ 100 MICRONS   FIG. 8
FIG. 12
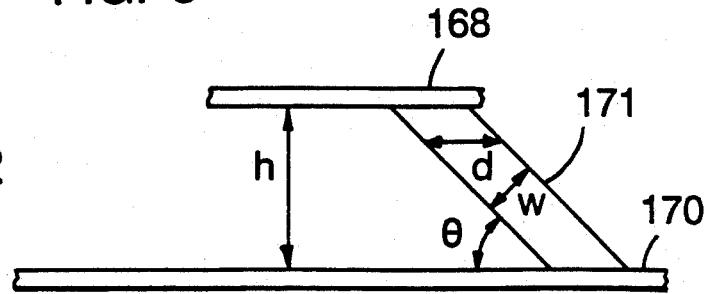

INFORMATION ENTRY AND DISPLAY

BACKGROUND OF THE INVENTION

This invention relates to entering and displaying two-dimensional information on a computer.

Flat panel displays for portable computers, for example, can display text and graphics as an array of binary, gray scale, or color pixels.

So-called touch pads can determine the location and trajectory of a finger, pen, or stylus on the surface of the pad to permit a user to point to a location or to draw or write information for entry to a computer. Some touch pads also provide a simultaneous display of the information being entered.

Scanners can scan a document to provide a digitized version of the document to a computer.

A variety of display and detection technologies have been used to provide the features of displays, touch pads, and scanners, including liquid crystal displays (LCDs), electroluminescent and gas plasma displays, magnetorestrictive and resistance based devices, and photoconductor arrays. Some display devices employ a hysteresis effect.

SUMMARY OF THE INVENTION

The invention provides display panels which enable effective document scanning, information display, and entry of information using a stylus. Broadly, the panels of the invention include (in the same panel) light emitting and light detecting functions which are arranged to permit effective scanning, display, and stylus reading techniques.

Thus, in general, in one aspect, the invention features a two-dimensional panel for scanning information at a scanning surface. The panel has a light emitting layer and a light detecting layer. The light emitting layer is configured to emit light onto the scanning surface at selected pixel locations in response to electrical signals, each electrical signal being impressed at a selected pixel location, the layer having optical apertures defining corresponding optical paths at the pixel locations for light to exit the opposite side of the layer from the scanning surface. The light detecting layer is configured to detect light exiting the layer at pixel locations. The light emitting layer is positioned between the light detecting layer and the scanning surface.

Preferred embodiments of the invention include the following features. The light emitting layer includes a non-luminescent transmissive display sublayer, and an electroluminescent sublayer, and the optical apertures are pinholes in the electroluminescent sublayer. The light emitting layer is an electroluminescent or gas plasma layer. The circuitry scans successive pixel locations of the light emitting layer and scans corresponding pixel locations of the light detecting layer to detect light which has been emitted from the light emitting layer, has been reflected from an object being scanned, and has been passed via the optical apertures to the light detecting layer. In some embodiments, an actuator shifts the relative positions of the light emitting layer and the light detecting layer by a fraction of a pixel location.

In some embodiments, the light detecting layer comprises a photoconductor. In some embodiments, the light detecting layer comprises a charge coupled device or a charge injection device and an optic array for directing light from pixel locations on the light emitting layer to pixel locations on the charge coupled or charge injection device. For use with photocopier equipment, circuitry may be provided for advancing the display from one stored image to a subsequent stored image upon detection of light impinging on the panel.

In some embodiments, in the light emitting layer, each electrical signal is impressed at a signal level higher than a present threshold value associated with said selected location. The layer exhibits a hysteresis effect such that when light is not being emitted from a pixel location, the present threshold value at that pixel location is relatively higher and when light is being emitted from a pixel location, present threshold value at that pixel location is relatively lower. Circuitry is provided to impress an electrical signal at a pixel location and at a selected signal level sufficient to cause light to begin to be emitted from that location if light is not then being emitted, or to cause light to continue to be emitted if light is then being emitted. The threshold value defines a value of impedance and the electrical signal is in the form of a voltage. The layer includes an electroluminescent material which emits light in response to the electrical signal (the electroluminescent material being arranged in one sublayer) and a photoconductive material which generates carrier electrons in response to light (the photoconductive material being arranged in a separate, photoconductive sublayer of the panel positioned to receive light emitted from the electroluminescent sublayer. In some embodiments the electroluminescent material and the photoconductive material may be mixed and arranged in a sublayer of the panel. In other embodiments, the layer is a single material which is both electroluminescent and photoconductive. The circuitry includes a pattern of conductive rows arranged on a surface of the layer and a pattern of conductive columns arranged on another surface of the layer, the intersection region of a given row conductor with a given column conductor defining a pixel location. A driver circuit applies the electrical signal between selected row and column conductors.

In some embodiments, the driver circuit applies the electrical signal at a level above the present threshold and at only a subset of the pixel locations. At a different time, the electrical signal is applied above the present threshold and at only another, different subset of the pixel locations. The subset and the different subset comprise disjoint subsets (interleaved checkerboard patterns) which together include all pixel locations on the panel.

In some embodiments, the driver circuit applies the electrical signal simultaneously at all of the pixel locations on the panel and at a level above the present threshold value.

In general, in another aspect, the invention features a method for scanning a document using a light emitting layer having an array of pixel locations. Light is generated at a first subset of fewer than all of the pixel locations of the light emitting layer, while light is not generated at a second subset of fewer than all of the pixel locations, the first and second subsets being arranged so light generating pixel locations have non-light generating pixel locations adjacent them. The document is placed in a position to reflect the light generated from the first subset of pixel locations in the direction of adjacent non-light generating pixel locations. Light reflected in the direction of the adjacent non-light generating pixel locations is permitted to pass through apertures in the light emitting layer. The light passed through is detected at pixel locations of a light detecting layer. In preferred embodiments, the steps are repeated with the roles of the first and second subsets reversed.

In general, in another aspect the invention features a method of deriving free-form information indicated by a computer user using a light emitting stylus at the surface of a two-dimensional panel. The panel is electrically preconditioned to emit light at pixel locations of the panel which receive light from the stylus when an electrical condition of the panel at the location falls below a threshold, and is conditioned thereafter to continue to emit light at the pixel locations even after the light is no longer being received from the stylus. The electrical condition of the panel is caused to fall below the threshold at pixel locations which receive light from the stylus. Light emitted from the pixel locations is detected.

Preferred embodiments of the invention include the following features. To locate the position of a stylus, a random subset of half of the pixel locations on the light emitting layer may be caused to be in an active state in which light generated by or reflected from a stylus at the scanning surface may be received at the light detecting layer. The remaining half of the pixel locations on the light emitting layer are caused to be in an opposite, passive state in which light generated by or reflected from the stylus may not be received at the detecting layer. If corresponding light is received at the light detecting layer, the active subset is replaced by a random subset of the active subset; otherwise the active subset is replaced by a random subset of the passive subset. The steps are repeated a number of times until the random subset generated in the final step contains only a single pixel location.

The invention enables simple and easy scanning of documents, display of information, and input of free-form information and cursor pointing in a compact unit. Other advantages and features will become apparent from the following description and from the claims.

DESCRIPTION

We first briefly describe the drawings.

FIG. 3 is a flowchart of a scanning mode of operation.

FIGS. 7 and 8 are perspective schematic views of two-layer AC embodiments.

FIG. 12 illustrates the geometry of the panel of FIG. 11.

Figure 1:
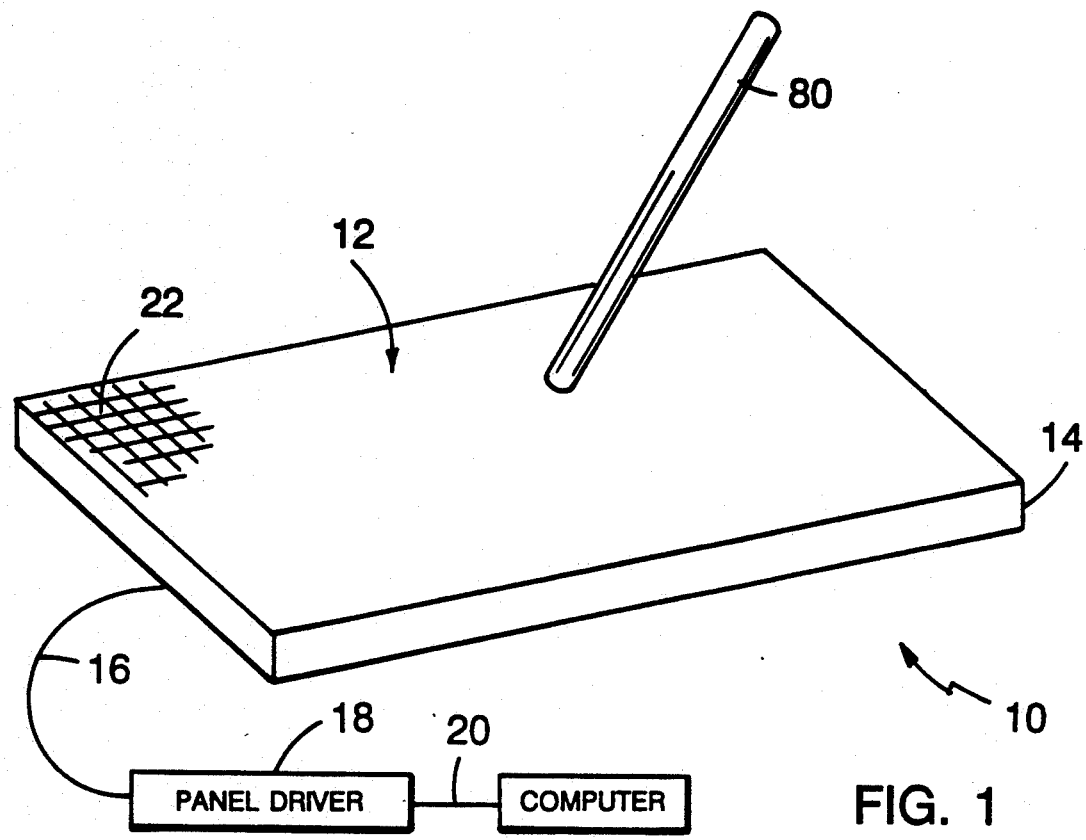
FIG. 1 is a partially perspective and partially schematic view of an input/output panel and stylus.

Referring to FIG. 1, a computer input/output device 10 includes a two-dimensional scan/display surface 12 on a panel 14. A cable 16 carries input and output signals between panel 14 and a panel driver 18. Panel driver 18 may be connected by another cable 20 to a parallel communication port of a personal computer. Surface 12 and panel 14 are conceptually organized in rows and columns of pixel locations 22.

In one mode of operation, device 10 may be used to display image information by selectively activating appropriate pixel locations corresponding to the image information. In another mode of operation, a document may be scanned by overlaying it on surface 12. In a third mode, free-form information "written" on surface 12 may be captured for entry into the computer.

Figure 2:
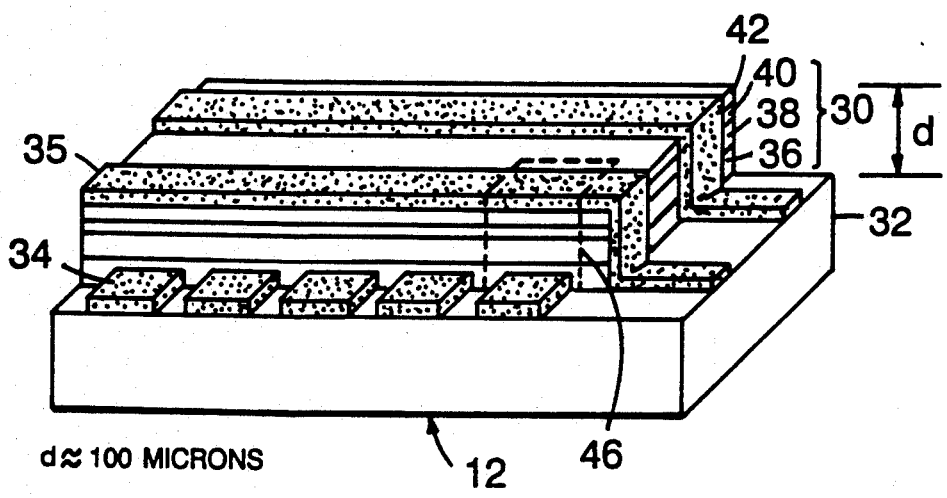
FIG. 2 is a perspective schematic view of a portion of the panel showing layers configured for AC signals.

Referring to FIG. 2, panel 14 (shown upside down relative to FIG. 1) may be formed as a single integrated device 30 on a glass substrate 32. Device 30 includes four continuous layers sandwiched between a pattern 34 of InSnO row conductors adjacent the glass substrate and a pattern 35 of opaque aluminum column conductors. Between the two patterns of conductors are a transparent barium titanate dielectric layer 36, a perforated ZnS electroluminescent phosphor layer 38, a transparent dielectric layer 40, and a Cd:SSe photoconductive layer 42. The intersection regions between the row and column conductors of patterns 34 and 35 define the locations of pixels 22. One such pixel region is suggested by dashed lines 46. The perforations of layer 38 comprise pinholes (not seen in FIG. 2) of dimension smaller than the pixel size, one pinhole for each pixel region. In some instances the holes may be small and naturally occurring, e.g., where the light emitting layer is very thin. Referring to FIG. 12, each pinhole is located and configured to permit light to pass into the corresponding pixel region only if the angle of incidence of the light on the panel is within a small range of perpendicular. The row and column conductors of patterns 34 and 35 are connected to cable 16 (FIG. 1) to carry signals for activating or "reading" selected pixel regions. The pixel density could provide an array of 480×640 pixels for a 7"×10" panel.

In a display mode of operation, stored image data is displayed on surface 12 by addressing appropriate row and column conductors in the same way that pixel locations are addressed in conventional AC-electroluminescent computer displays. A pixel region of the phosphor layer 38 emits light when a sufficient AC voltage is applied to the row and column conductors which define the pixel region. The threshold voltage required to cause light emission is determined by the local impedance between the row and column conductors. The emitted light causes the adjacent region of the photoconductive layer 40 to generate carrier electrons which lowers the local impedance between the row and column conductors. This permits the light emission to be maintained by a lower voltage than the one originally applied. This hysteresis feedback characteristic effectively provides each pixel location with a "memory" that permits it to maintain its prior state even when the original level of activating voltage has been removed. This permits the display to have a quick response time and high contrast, without requiring a network of thin-film transistors or a long phosphorescent lifetime (which slows response).

Referring to FIG. 3, in a scanning mode of operation, a document to be scanned is laid face down on the glass substrate (step 50). A checkerboard pattern of pixel locations (i.e., alternating pixel locations in each row and column of pixel locations) are addressed with a voltage over threshold, causing them to emit light (we call these presently illuminated pixels the "even" pixels); the remaining pixel locations (called the "odd"

pixels) are addressed at a voltage just below threshold (step 52). Light from the illuminated even pixels is reflected by the white parts of the document back onto the photoconductive layer (step 54). Thus if the document is white at the location of one of the illuminated pixel locations, the light is reflected to the portion of the photoconductive layer 40 within that same pixel location and to locally adjacent "odd" pixel locations. The reflected light triggers formation of carrier electrons in the photoconductive layer, which lowers the threshold voltage locally in the odd pixel locations. Lowering the threshold allows the odd pixel locations to emit light corresponding to the white areas of the document (step 56). Dark areas of the document do not reflect light to the adjacent odd pixel locations so they do not become illuminated. Thus, an image of the document is stored in analog fashion and displayed on surface 12 by the odd pixels 12 interleaved between the already illuminated even pixels (step 58).

Now the process is reversed. The even pixel locations are addressed at a voltage just below threshold (step 60) and the odd pixel locations are addressed at a voltage above threshold to provide light which is then reflected from the document to the even pixel locations (step 62). Steps 54, 56, and 58 are repeated with respect to the even pixel locations. Once this cycle is completed the panel pixel locations retain an inverted analog replica of the image of the document.

Next, the analog image information stored in the display is read out and digitized by an A/D converter in the panel driver (step 64). The A/D converter detects the impedance (by measuring capacitance) between each row/column conductor pair. The digitized values are then stored in memory for later use. The panel is cleared of the stored image by dropping the addressing voltage to zero.

In a third mode, free-form handwritten information may be entered into the panel by using a special stylus 80 (FIG. 1). The stylus contains a light emitting diode 82 or a laser diode oriented to emit light of a wavelength suitable for generating carrier electrons in the photoconductive layer. In operation, all pixel locations of the panel first are addressed with a voltage below threshold. As the tip of the stylus is drawn across the surface of the panel, it locally generates carriers in the photoconductive layer, reducing the local impedance and causing light emission locally along the path of the stylus. The path of the stylus is stored in analog form in the panel and subsequently may be read out by the A/D converter as explained above.

Figure 4:
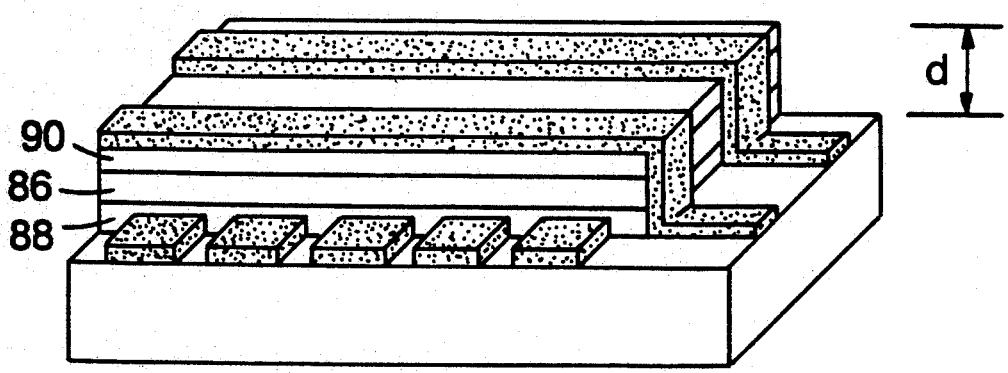
FIG. 4 is a perspective schematic view of another embodiment for AC.

Referring to FIG. 4, in another arrangement the separate photoconductor layer is eliminated and a single electroluminescent phosphor-photoconductive layer 86 (formed as a mixture of ZnS with Cd:SSe) is provided between two transparent dielectric layers 88, 90. Alternatively it may be possible to use ZnS alone because it appears to have some degree of photoconductivity.

Figure 5:
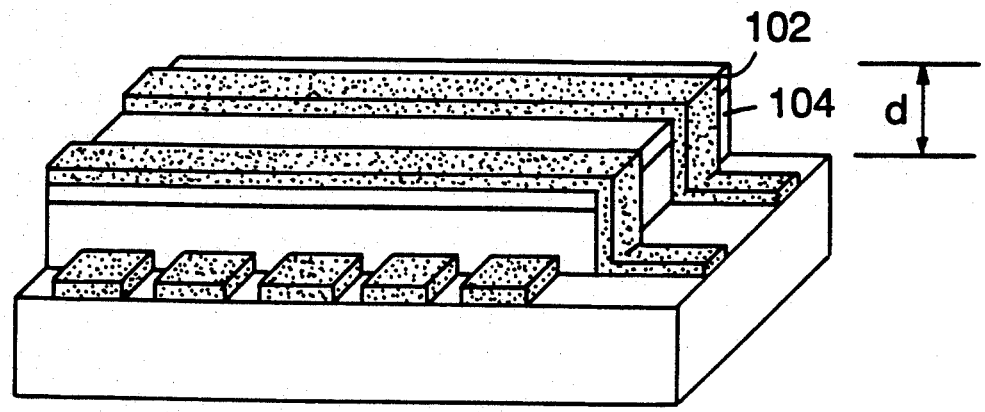
FIGS. 5 and 6 are perspective schematic views of DC embodiments.
Figure 6:
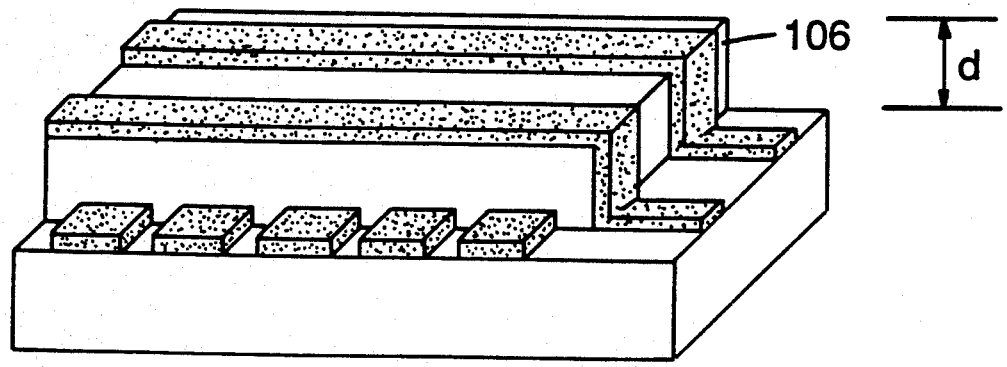

Referring to FIG. 5, a DC panel may be formed by sandwiching, between the patterns of row and column conductors, a photoconductive layer (Cd:SSe) 102 and a perforated electroluminescent phosphor layer (ZnS:CuMn) 104. Referring to FIG. 6, another arrangement for a DC panel uses a single electroluminescent phosphor-photoconductor layer 106 (a mixture of ZnS:CuMn with Cd:SSe).

The DC panels operate in the same modes as the AC panels except that the nature of the impedance change caused by the photoinduced carriers is a change in resistivity which is detected as a change in the current flowing through the pixel location (rather than a change in permitivity measured as a change in capacitance).

Referring to Fig. 7, a double layer panel includes an image storage unit 110 below an optical write unit 112. The image storage unit has the same layers as the panel of FIG. 2 except that the photoconductive layer CdS is sintered and combined with the transparent dielectric to form a single layer 114. The double layer arrangement would allow a high resolution image to be written with the optical write unit, then the optical write unit could be physically displaced by a piezoelectric transducer and a second interleaved image could be written.

The optical write unit 112 is a conventional pixel addressable electroluminescent display having an electroluminescent layer 116 embedded within a transparent dielectric 118. In FIG. 7, the two units are fabricated on top of one another on the substrate with an optical mask 120 between them. Referring to FIG. 8, the same panel could be fabricated in two pieces. DC panels similar to those of FIGS. 7 and 8 could be fabricated by omitting the dielectric layers.

In operation in the display mode, the purpose of the optical write unit is to "write" image information from storage onto the image storage unit. When a pixel location in the optical write unit is illuminated, the light will pass through the optical mask and fall on a small area of the photoconductive layer of the image storage unit below the illuminated pixel location. The operation of the image storage unit then proceeds as explained for FIG. 2; the unit will continue to store the image even if the illumination from the optical write unit is turned off. This ability to store the image, once written, without requiring external refreshing enables the two layer panel to provide a very high resolution digital display. In known displays, the time required for refresh limits the total number of pixel locations of the display. In active matrix displays which have local capacitors to store the pixel value, packing density is limited.

The copy mode and handwriting input mode of the two unit displays are similar to those of the single layer panels of FIGS. 2 and 4 through 6.

Details of the construction of AC and DC electroluminescent layers is given in Wilson et al., *Optoelectronics: An Introduction, Prentice/Hall* 1983, incorporated by reference. In the case of the AC devices, Wilson et al. suggest that phosphor particles be embedded in a nonconducting binding medium; but it would also be possible simply to surround the phosphor particles by dielectric layers, as suggested in FIGS. 2, 4, 7, and 8. The phosphor is generally Zn:CuMn. AC layers can exhibit luminances of 40 candelas per square meter and DC layers luminances of 300 candelas per square meter, both luminances being compatible with typical photoconductive materials.

Wilson et al. also discuss the possible physical mechanisms (quantum mechanical tunneling and avalanche processes) causing electroluminescent emission in such layers.

The photoconductive layer exhibits increased material conductivity due to photogenerated carriers. CdS, commonly used, has a peak responsivity at 515 nm. By adding Selenide (Se) the responsivity can be tuned between 515 nm and 730 nm covering most of the visible spectrum and allowing one to tune the response of the photoconductive layer to the emission peak of the electroluminescent layer. The process for making Cd:SSe is set forth in Blazo, *High Resolution Electrophoretic Dis-*

*play with Photoconductor Addressing,* SID Dig., 1982, pp. 92–93, incorporated by reference. Cd:SSe is mixed with copper to produce a Cd:SSe:Cu pigment which is then dispersed in an epoxy resin. The mixture is sprayed onto the substrate to a dry thickness of 50 microns (evaporation deposition could also be used). Other photoconductive materials (ZnS, GaAs, Si, and Ge have responsivities ranging from 300 nm to 1800 nm and offer tradeoffs in cost of manufacture, response wavelength, and response time.

In the DC device, if voltage V is imposed across the row and column conductors, the change in current flowing through the perforated electroluminescent phosphor layer due to a change in the flux of incident light falling on the photoconductive layer is delta I proportional to delta dp * S * V/d, where S is the surface area of an individual pixel location, d is the thickness of the photoconductive layer and delta dp is the change in the flux of incident light falling on the photoconductive layer from the perforated electroluminescent phosphor layer.

As light falls on the photoconductive layer, more current flows through the perforated electroluminescent phosphor layer and consequently the perforated electroluminescent phosphor layer gives off light, perpetuating the process. d is chosen so that for a given operating voltage V no or little light is emitted by the perforated electroluminescent phosphor layer if no light is incident on the photoconductive layer. d is typically of the order of 10s of microns.

In the AC device, the effect is instead a change in the dielectric constant of the material between the conductors, leading to a change in capacitance which can be measured with a capacitance. See Hamamatsu Corp., *CdS Photoconductive Cells,* catalog, 1990–1991, incorporated by reference.

The barium titanate dielectric layers, the transparent conductors, and the opaque conductors are deposited using standard processes such as those used in commercially available displays (e.g., those available from Planar Corp. of Beaverton, Oregon).

Figure 9:
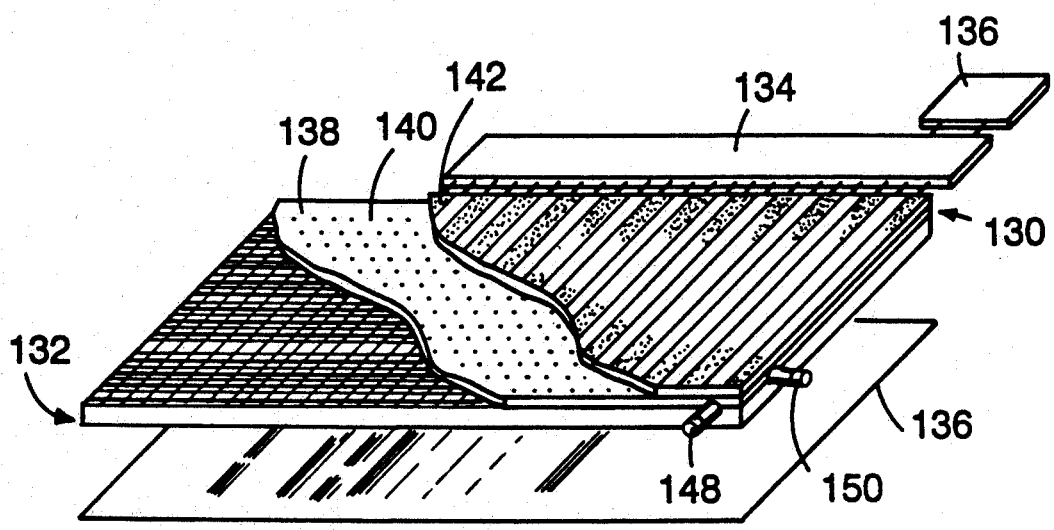
FIG. 9 is a perspective schematic view of an LCD embodiment.

Other arrangements of the panel are possible. Referring to FIG. 9, for example, panel 130 includes a non-luminescent flat screen transmissive (e.g., LCD) display layer 132; each pixel location of layer 132 may be set to either a transparent or an opaque state via a driver (not shown). An electroluminescent layer 138 perforated by an array of pinholes 140, one for each pixel location is positioned so that layer 132 is between layer 138 and document 136. The power used to illuminate layer 138 may be modulated to permit the emitted light to be distinguished from ambient light. (A single luminescent flat display layer—e.g., electroluminescent or gas plasma—may be substituted for layers 132, 138.) Adjacent layer 138 is a layer 142 of light-sensitive photoconductors which may be equipped with a filter to screen sun light or room light. The pixel locations of layer 142 are analog multiplexed by a multiplexer 134 to a single analog to digital converter 136. The multiplexer has a latch for each of its ports. The system of FIG. 9 would also include the following elements, not shown: a microprocessor to control the reading and writing of pixel locations in the panel, and to run programs; a ROM memory to store the programs and operating system; a RAM for storing scanned images and other software; and a keyboard and pointing device for entering data.

To use the panel of FIG. 9 for scanning, the microprocessor causes a bias to be applied sequentially to the pixel locations of layer 132 so that successive pixel locations are made transparent in one row (see FIG. 9) while all other rows are kept opaque. Layer 138 is kept illuminated throughout this scanning causing light to pass through successive transparent pixel locations onto the document. Reflected light returns through the pinhole to the corresponding pixel location of layer 142 and the resulting signals are read successively by means of multiplexer 134 and digitized in A-to-D 136 to generate a stream of pixel values corresponding to the document. Note that multiplexer 134 enables one column after another so that by proper activation of the successive rows of layer 132 and the successive columns of layer 142, only one pixel location is read at a time. Assuming a 640×480 array of pixel locations and response time of 200 ms, it would take 96 seconds to scan the entire array. It may be possible to reduce the response time by not modulating the pixel locations to full brightness. Use of an electroluminescent or gas plasma layer (which would be faster than LCDs) would also speed the overall time for scanning.

For purposes of optical character recognition, the effective resolution of the device can be increased using digital enhancement algorithms based on knowledge of the letter shapes of a particular alphabet.

A color scanner could be achieved by adding red, green, and blue transmissive color filter stripes between the LCD layer and the flat panel illuminator layer. Each stripe would be positioned adjacent a single horizontal row of display pixel locations, and the successive filter stripes would have a cyclic pattern: red, green, blue, red, green, blue .... The same arrangement would permit color display of images. The stripes could also be placed between the illuminator layer and the photodetector layer, but then only color scanning, not color display, would be possible.

Resolution of the scanned image may be enhanced, at the cost of additional time required for a complete scan by arranging the panel so that the illuminator layer or the luminescent flat screen display layer may be moved horizontally by a fraction of a pixel location in each of two dimensions relative to the photodetector layer. This could be done using piezoelectric actuators 148, 150. Following a complete scan cycle, the layer is shifted slightly and a second scan is made. The scanning time increases with the square of the increase in resolution. As before, the panel of FIG. 9 may be used with a stylus containing an LED, which could be modulated—by electronics contained within the stylus—at a specific frequency compatible with the response time of the panel to enable it to be distinguished from ambient light. Alternatively, the stylus could simply have a reflector at its tip to reflect light from the illuminator layer through the pinholes to the photodetector layer. By repeatedly scanning the panel, the path of the stylus can be followed and stored. The trajectory is then displayed on the flat panel display. If the tip area is on the order of a pixel region in size, then at most four pixel locations directly underneath the stylus will have a high "reading", i.e., the effect is sufficiently confined to distinguish the stylus from the user's writing hand and from diffuse ambient light.

The stylus could also be used as a pointer, i.e., to indicate specific x,y coordinates on the display, without interfering with an image being displayed. To accomplish this, the state of half of the pixel locations is inverted (i.e., if a pixel is in the opaque state it is switched to the transparent state and vice versa) in a predetermined random pattern for a brief period (e.g., 1/30th second). If the photodetectors detect a transient signal change then the illuminated pixel location is among the half pixel locations set to the inverted state; otherwise it is among the non-inverted half. A predetermined random half of the selected set is then inverted; and the process is repeated until the state of only a single pixel location is inverted to determine the unique position of the stylus. This process requires N*t seconds where $2^N$=the number of pixel locations in the display (e.g., 640×480), and t is the response time of the display. The use of randomness assures that the user does not see any flicker of the display.

The processes of locating the position of the stylus and of tracking its motion could be combined so that the location of the stylus would first be located and then its motion tracked; if tracking were lost at any time, the process would revert to finding the location of the stylus.

Figure 10:
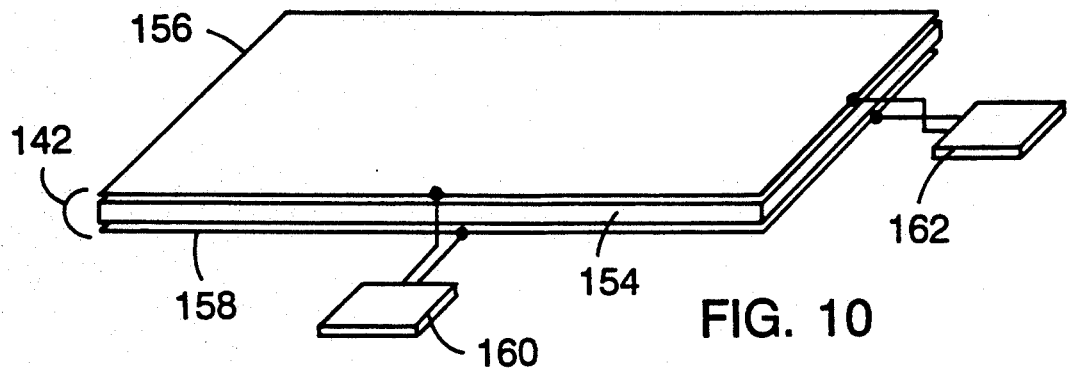
FIG. 10 is a perspective schematic view of a photoconductive layer.

Referring to FIG. 10, in another arrangement for finding the position of a stylus, the photodetective layer 142 of the panel of FIG. 9, is replaced by a photoconductive sublayer 154 (cadmium sulphide, cadmium selenide, or lead sulphide) sandwiched between a transparent resistive sublayer 156 (indium tin oxide) and an opaque conducting sublayer 158. X-axis and y-axis A-to-D converters 160, 162 are connected along the respective edges of the panel. When light passing through one of the pinholes strikes layer 142, it passes through the transparent resistive sublayer 156 (note that the layer shown in FIG. 10 is inverted relative to its position in FIG. 9) to the photoconductive sublayer 154 where it causes charges to be elevated to a conduction band (photoelectric effect). This causes completion of a circuit. The A-to-D converters measure the resistances along the x-axis and y-axis to the pixel location where the circuit became completed, thus indicating the location of the stylus. By striping the photoconductive layer and analog multiplexing it to an A-to-D converter as shown in FIG. 9, the device could also be used for digitally scanning documents. For a lead sulphide photoconductor having a response time of 200 microseconds and a pixel pitch of 0.35 mm, the device would have a rapid enough response time to track cursively written English (velocity—4.5 cm/sec). Note that in this mode of operation the voltage on the LCD layer must be adjusted so that even "opaque" pixel locations allow the passage of some light, which will diminish the contrast of the display. In determining the stylus position the microprocessor must use not only the outputs of the x-axis and y-axis A-to-D converters but also information about which pixel locations are in opaque and non-opaque display states, because that will affect the "reading" for light reaching the photoconductive layer at a given pixel location.

In cases where it is necessary to display the trajectory of a stylus being used for handwriting, so-called active matrix LCDs or electroluminescent or gas plasma layers would normally be needed for the display to be rapid enough to track cursive handwriting. It may be possible to use a conventional LCD to "keep up" with the handwriting, by providing a phosphorescent coating on the panel or providing an electrophosphorescent or other image storage layer. Then when a light emitting stylus (or one connected to a voltage) "writes" on the panel, the panel phosphoresces along the trajectory for some period of time, giving the LCD time to "catch up". Such a scheme would interfere, however, with the ability of the panel to scan a document.

Figure 11:
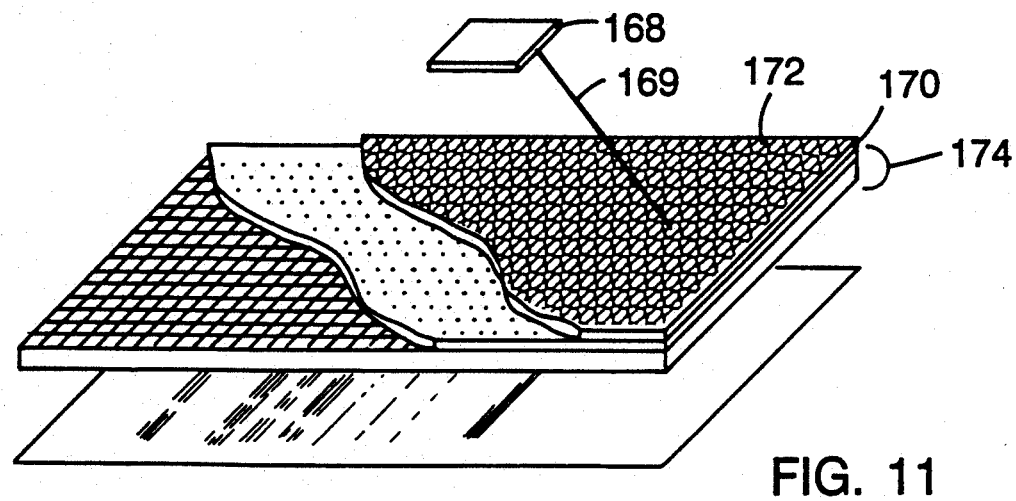
FIG. 11 is a perspective schematic view of a CAD/optic array embodiment of the panel.

Referring to FIG. 11, in another implementation, the photodetector layer may be replaced by a charge coupled device (CAD) or a charge injection device (CID) 168 to digitally capture an image of the scanned document. Such devices have a high pixel count (e.g., 640×480), short response time (e.g., 33 ms for a full frame), and high sensitivity (down to 1 lux). Because of their small size (1 cm×1 cm) a binary optic array or holographic optic array 170 would be used to transfer the image from the document to the CAD or CID device. The effect of the optic array is to create a lenslet 172 in front of each pixel to transfer the pixel image received via a pinhole along a path 169 over a short distance to the CAD or CID from a corresponding location on the flat panel illuminator 174 (which could be either an LCD layer with a separate pinholed illuminator, or a pinholed electroluminescent or gas plasma illuminator with all pixel locations in the transparent state).

Referring to FIG. 12, the distance h between the CAD 168 and the optic array 170 could be as small as 0.35" for a document 11" long, determined as follows. The width w of the light ray 171 is determined by the diffraction limit and is approximately 1 micrometer for visible light. The angle theta must be chosen such that d is less than or equal to the width of a single light sensitive element of the image capture chip. Assuming that there are 640 such elements in a 1 cm length this width is equal to (1 cm/640) $1.56 \times 10^{-5}$ m. therefor theta must be about 0.064 degrees.

The panel could also be used to create a paper copy using a conventional photocopier by laying the panel face down on the platen of the photocopier, and displaying the image on it. If there are multiple stored pages to be displayed, the copying could be done automatically by using the photodetecting layer to determine when the photocopier's light has been illuminated to make a copy, then automatically advancing the panel display to show the next document to be copied.

Other embodiments are within the scope of the following claims.

I claim:

1. A two-dimensional panel for scanning information at a scanning surface, comprising
    a light emitting layer configured to emit light onto said scanning surface at selected pixel locations of said light emitting layer in response to electrical signals, each electrical signal being impressed at one of said selected pixel locations of said light emitting layer, said layer having optical apertures defining corresponding optical paths at said pixel locations for light to exit said layer from a side of said layer opposite from said scanning surface, and
    a light detecting layer configured to detect light which has been generated by said light emitting layer, reflected from an object being scanned, passed via said apertures, and exited said light emitting layer from said opposite side at said pixel locations, said light detecting layer being positioned such that said light emitting layer is between said light detecting layer and said scanning surface.

2. The panel of claim 1 wherein
    said light emitting layer comprises a non-luminescent transmissive display sublayer, and an electroluminescent sublayer, and said optical apertures comprise pinholes in said electroluminescent sublayer.

3. The panel of claim 1 wherein said light emitting layer comprises an electroluminescent or gas plasma layer.

4. The panel of claim 1 further comprising
circuitry for scanning successive pixel locations of said light emitting layer and scanning corresponding pixel locations of said light detecting layer to detect light which has been emitted from said light emitting layer, reflected from an object being scanned, and passed via said optical apertures to said light detecting layer.

5. The panel of claim 1 further comprising
an actuator for shifting said relative positions of said light emitting layer and said light detecting layer by a fraction of a pixel location.

6. The panel of claim 1 further comprising circuitry for
a. causing a random subset comprising half of said pixel locations on said light emitting layer to be in an active state in which light generated by or reflected from a stylus at said scanning surface may be received at light detecting layer,
b. causing said subset comprising said remaining half of said pixel locations on said light emitting layer to be in an opposite, passive state in which light generated by or reflected from said stylus may not be received at said detecting layer,
c. detecting whether corresponding light is received at said light detecting layer,
d. if step c is true, replacing said active subset with a random subset of said active subset, or if step c is not true, replacing said active subset with a random subset of said passive subset, and
e. repeating steps a through c a number of times until said random subset generated in step d contains only a single pixel location.

7. The panel of claim 1 wherein said light detecting layer comprises a photoconductor.

8. The panel of claim 1 wherein said light detecting layer comprises a charge coupled device or a charge injection device and an optic array for directing light from pixel locations on said light emitting layer to pixel locations on said charge coupled or charge injection device.

9. The panel of claim 1 further comprising
circuitry for advancing said display from one stored image to a subsequent stored image upon detection of light impinging on said panel.

10. The panel of claim 1 wherein said panel is adapted to serve as an active matrix display.

11. The panel of claim 1 wherein,
in said light emitting layer, each electrical signal is impressed at a signal level higher than a present threshold value associated with said selected location,
said layer exhibiting a hysteresis effect such that when light is not being emitted from a pixel location, said present threshold value at that pixel location is higher than the present threshold value when light is being emitted from said pixel location, and when light is being emitted from a pixel location, said present threshold value at that pixel location is lower than the present threshold value when light is not being emitted from said pixel location, and circuitry configured to impress an electrical signal at a pixel location and at a selected signal level sufficient
to cause light to begin to be emitted from that location if light is not then being emitted, or
to cause light to continue to be emitted if light is then being emitted.

12. The panel of claim 11 wherein said threshold value defines a value of impedance and said electrical signal comprises a voltage.

13. The panel of claim 11 wherein said layer configured to emit light comprises an electroluminescent material which emits light in response to said electrical signal and a photoconductive material which generates carrier electrons in response to light.

14. The panel of claim 13 wherein said electroluminescent material is arranged in an electroluminescent sublayer of said panel and said photoconductive material is arranged in a separate, photoconductive sublayer of said panel positioned to receive light emitted from said electroluminescent sublayer.

15. The panel of claim 13 wherein said electroluminescent material and said photoconductive material are mixed and arranged in a sublayer of said panel.

16. The panel of claim 13 wherein said layer configured to emit light comprises a material which is both electroluminescent and photoconductive.

17. The panel of claim 11 wherein said circuitry comprises a pattern of conductive rows arranged on a surface of said layer and a pattern of conductive columns arranged on another surface of said layer, said intersection region of a given row conductor with a given column conductor defining a pixel, and a driver circuit for applying said electrical signal between a selected row and column conductors.

18. The panel of claim 17 further comprising
circuitry for measuring impedance, capacitance, or resistance between any row conductor and column conductor for detecting the state of the pixel located at said row and column.

19. The panel of claim 11 wherein said optical apertures define corresponding optical paths for light to enter said layer at said pixel locations, each optical path permitting only light impinging on said layer within a predetermined angle of incidence to enter said layer at said pixel location.

20. Said panel of claim 11 wherein said circuitry comprises a driver circuit connected to
apply said electrical signal at a level above said present threshold and at only a subset of said pixel locations at a level above said present threshold value, and
at a different time, apply said electrical signal above said present threshold and at only another, different subset of said pixel locations.

21. Said panel of claim 20 wherein said subset and said different subset comprise disjoint subsets which together include all pixel locations on said panel.

22. The panel of claim 21 wherein said disjoint subsets are arranged in interleaved checkerboard patterns.

23. The panel of claim 22 wherein said circuitry comprises a driver circuit connected to
apply said electrical signal simultaneously at all of said pixel locations on said panel and at a level above said present threshold value.

24. A two-dimensional panel for displaying information at a surface, comprising
a layer having an electroluminescent material which emits light from selected pixel locations of said layer in response to a voltage, said voltage being impressed at one of said selected pixel locations of said layer and at a voltage level higher than a present threshold value determined by an impedance associated with said selected location, and a photoconductive material which generates carrier electrons in response to light, said layer exhibiting a hysteresis effect such that when light is not being emitted from a pixel location, said present threshold value at that pixel location is higher than the present threshold value when light is being emitted from said pixel location, and when light is being emitted from a pixel location, said present threshold value at that pixel location is lower than the present threshold value when light is not being emitted from said pixel location, said layer further comprising optical apertures defining corresponding optical paths for light to enter said layer at said pixel locations, each optical path permitting only light impinging on said layer within a predetermined angle of incidence to enter said layer at said pixel location, and circuitry comprising a pattern of conductive rows arranged on a surface of said layer and a pattern of conductive columns arranged on another surface of said layer, said intersection region of a given row conductor with a given column conductor defining a pixel location, and a driver circuit for applying said electrical signal between a selected row and column conductors, said circuitry being configured to impress a voltage at a pixel location and at a selected voltage level sufficient to cause light to begin to be emitted from that location if light is not then being emitted, or to cause light to continue to be emitted if light is then being emitted.

25. A method for scanning a document using a light emitting layer having an array of pixel locations, comprising a. generating light at a first subset of fewer than all of said pixel locations of said light emitting layer, while generating no light at a second subset of fewer than all of said pixel locations, said first and second subsets being arranged so light generating pixel locations have non-light generating pixels adjacent them, b. placing said document in a position to reflect said light generated from said first subset of pixel locations in the direction of adjacent said non-light generating pixel locations, c. permitting light reflected in said direction of said adjacent non-light generating pixel locations to pass through apertures in said light emitting layer, and d. detecting said passed through light at pixel locations of a light detecting layer.

26. The method of claim 25 further comprising performing steps a, b, c, and d with said roles of said first and second subsets reversed.

27. The method of claim 26 wherein said first and second subsets comprise disjoint subsets which together include all pixel locations on said layer.

28. The method of claim 27 wherein said disjoint subsets are arranged in interleaved checkerboard patterns.

29. A method of deriving free-form information indicated by a computer user using a light emitting stylus at a surface of a two-dimensional panel, comprising electrically preconditioning said panel to emit light at pixel locations of said panel which receive light from said stylus when an electrical condition of said panel at said location falls below a threshold, and thereafter to continue to emit light at said pixel locations even after said light is no longer being received from said stylus, causing said electrical condition of said panel to fall below said threshold at pixel locations which receive light from said stylus, and detecting light emitted from said pixel locations.

30. A two-dimensional panel for displaying information at a surface, comprising an image storage unit having a layer configured to emit light from selected pixel locations of said layer in response to electrical signals, each electrical signal being impressed at one of said selected pixel locations of said light emitting layer and at a signal level higher than a present threshold value associated with said selected location, said layer exhibiting a hysteresis effect such that when light is not being emitted from a pixel location, said present threshold value at that pixel location is higher than the present threshold value when light is being emitted from said pixel location, and when light is being emitted from a pixel location, said present threshold value at that pixel location is lower than the present threshold value when light is not being emitted from said pixel location, an optical write unit comprising a pixel addressable electroluminescent display, and circuitry configured to impress an electrical signal at a pixel location and at a selected signal level sufficient to cause light to begin to be emitted from that location if light is not then being emitted or to cause light to continue to be emitted if light is then being emitted.

31. A two-dimensional panel for locating the pixel position of a stylus at a scanning surface, comprising a nonluminescent transmissive display layer adjacent said scanning surface, a light emitting layer configured to emit light through said transmissive display layer and onto said scanning surface, said light emitting layer having optical apertures defining corresponding optical paths at said pixel locations for light to exit said light emitting layer from a side of said light emitting layer opposite from said scanning surface, and a photoconductive layer, said light emitting layer being positioned between said photoconductive layer and said scanning surface, said photoconductive layer being arranged to receive light which has been generated by said stylus or generated by said light emitting layer and reflected from said stylus, passed via said apertures, and exited said light emitting layer from said opposite side, and to close a circuit at a pixel location upon which said light impinges, and circuitry for measuring the impedances along X and Y axes to a location on the photoconductive layer where a circuit has been closed, in order to identify the pixel location of the stylus.

* * * * *